US012634907B2

(12) United States Patent
Li

(10) Patent No.: US 12,634,907 B2
(45) Date of Patent: May 19, 2026

(54) SWITCHING METHOD AND APPARATUS FOR TERMINAL, DEVICE AND MEDIUM

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 516 days.

(21) Appl. No.: 18/003,283

(22) PCT Filed: Aug. 5, 2020

(86) PCT No.: PCT/CN2020/107159
§ 371 (c)(1),
(2) Date: Dec. 23, 2022

(87) PCT Pub. No.: WO2022/027335
PCT Pub. Date: Feb. 10, 2022

(65) Prior Publication Data
US 2023/0247606 A1     Aug. 3, 2023

(51) Int. Cl.
*H04B 7/185* (2006.01)
*H04W 16/28* (2009.01)
*H04W 72/044* (2023.01)
*H04W 72/0453* (2023.01)

(52) U.S. Cl.
CPC ....... *H04W 72/0453* (2013.01); *H04W 16/28* (2013.01); *H04W 72/046* (2013.01)

(58) Field of Classification Search
CPC ............. H04W 72/0453; H04W 16/28; H04W 72/046; H04W 36/0072; H04W 72/23; H04W 36/008355; H04W 36/24; H04W 36/249; H04B 7/18513; H04B 7/18541; H04B 7/2041; H04B 7/0695
See application file for complete search history.

(56) References Cited

U.S. PATENT DOCUMENTS

| | | | | |
|---|---|---|---|---|
| 2015/0249941 A1* | 9/2015 | Wang | .................... | H04W 36/06 |
| | | | | 370/329 |
| 2016/0374048 A1* | 12/2016 | Griot | ....................... | H04W 4/70 |
| 2019/0222404 A1 | 7/2019 | Ang et al. | | |

(Continued)

FOREIGN PATENT DOCUMENTS

| | | |
|---|---|---|
| CN | 107454634 A | 12/2017 |
| CN | 110249573 A | 9/2019 |

(Continued)

OTHER PUBLICATIONS

International Search Report and Written Opinion of International Application No. PCT/CN2020/107159, mailed Apr. 28, 2021, 16 pages.

(Continued)

*Primary Examiner* — Thai Nguyen
(74) *Attorney, Agent, or Firm* — Finnegan, Henderson, Farabow, Garrett & Dunner, L.L.P.

(57) ABSTRACT

A switching method is performed by a terminal, and includes: receiving an indication signaling, wherein the indication signaling is configured to indicate a target communication resource; and switching to the target communication resource from a service communication resource based on the indication signaling.

37 Claims, 3 Drawing Sheets network device terminal

320: sends a first RRC signaling to the terminal. The first RRC signaling is configured to coordinately indicate the indication signaling 340: receiving the first RRC signaling 360: switching from the service frequency spectrum resource to the target frequency spectrum resource based on the instruction signaling, and/or switching from the service beam direction to the target beam direction based on the instruction signaling

(56) References Cited

U.S. PATENT DOCUMENTS

| 2019/0260447 | A1   | 8/2019  | Nam et al. | |
|---|---|---|---|---|
| 2019/0319748 | A1 * | 10/2019 | Nam | H04W 72/563 |
| 2020/0351730 | A1 * | 11/2020 | Park | H04W 36/0077 |

FOREIGN PATENT DOCUMENTS

| CN | 110519843 | A | 11/2019 | | |
|---|---|---|---|---|---|
| CN | 110545138 | A | 12/2019 | | |
| CN | 111147211 | A | 5/2020 | | |
| WO | WO-2005050899 | A2 * | 6/2005 | | H04B 7/0695 |
| WO | WO-2018105725 | A1 * | 6/2018 | | H04W 56/00 |
| WO | WO-2022027232 | A1 * | 2/2022 | | H04B 7/185 |

OTHER PUBLICATIONS

Extended European Search Report Issued in Application No. 20948357.7 dated Apr. 4, 2024, 13 pages.
"Discussion on physical layer control procedures for NTN", 3GPP TSG-RAN WG1 Meeting #98, R1-1908934, Asia Pacific Telecom, Prague, Czech Republic, Aug. 26-30, 2019, 6 pages.
"Physical layer control procedure enhancement", 3GPP TSG RAN WG1 Meeting #99, R1-1912164, CATT, Reno, USA, Nov. 18-22, 2019, 4 pages.
First Office Action issued by the State Intellectual Property Office of People's Republic of China on Dec. 31, 2024, in corresponding Application No. CN 202080001851.1, 17 pages.
The Second Office Action issued by the State Intellectual Property Office of People's Republic of China on May 16, 2025, in corresponding Application No. CN 202080001851.1, 17 pages.

* cited by examiner

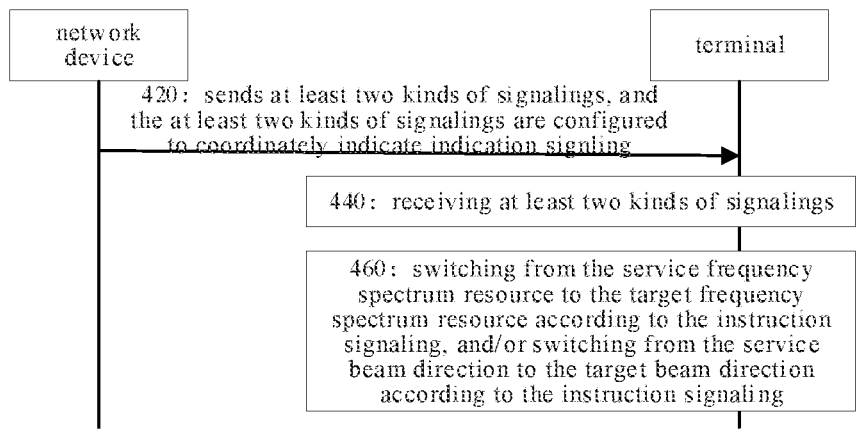
FIG. 4
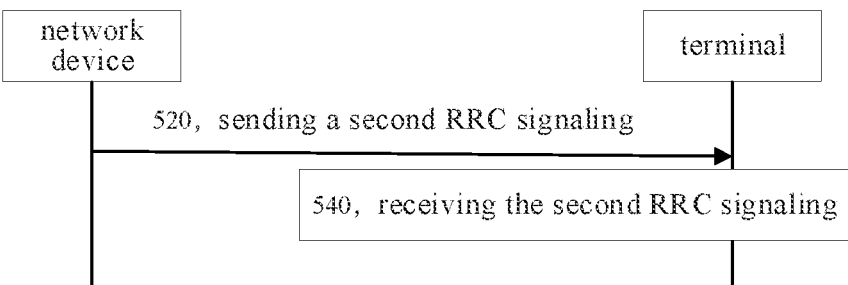
FIG. 5
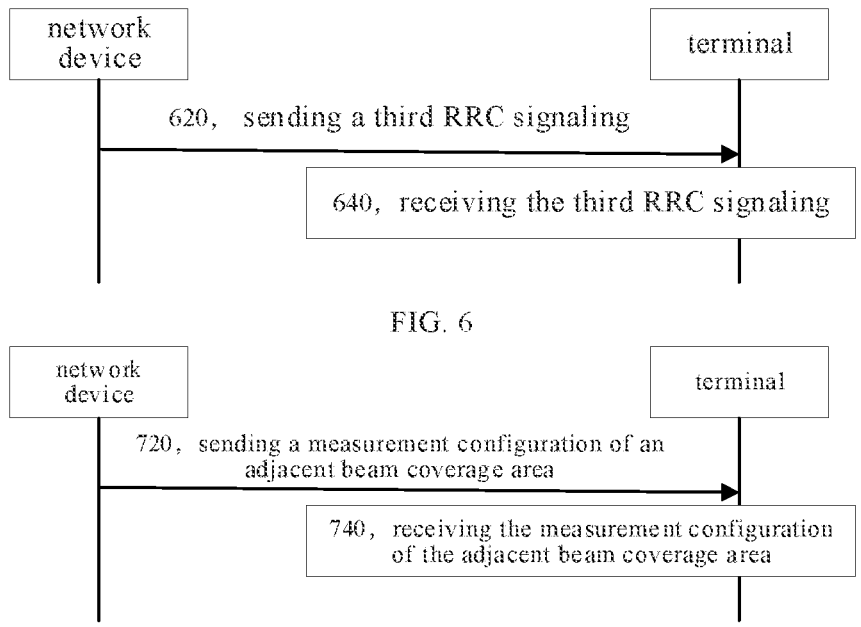
FIG. 6
FIG. 7

SWITCHING METHOD AND APPARATUS FOR TERMINAL, DEVICE AND MEDIUM

CROSS-REFERENCE TO RELATED APPLICATION

This application is a U.S. national phase of International Application No. PCT/CN2020/107159, filed on Aug. 5, 2020, the entire content of which is herein incorporated by reference.

TECHNICAL FIELD

The disclosure relates to a wireless communication field, and particularly to a switching method for a terminal, a switching apparatus for a terminal, a device and a medium.

BACKGROUND

In a satellite communication, a satellite uses different beams to cover different areas, and each area can be referred to as a beam coverage area (i.e., beam footprint). In order to avoid a co-channel interference, different beam coverage areas use different beams and different frequency domain resources. Also, in order to avoid interference between different satellites, when different satellites cover the same position on the ground, different frequency domain resources are used. The same applies to a signaling beam (such as a synchronization signal block) and a data beam. The signaling frequency domain resource and the data frequency domain resource of the same satellite covering the same position may be the same or different. Different frequency domain resources may be different bandwidth parts (BWPs) or different component carriers (CCs).

SUMMARY

Embodiments of the disclosure provide a switching method for a terminal, a switching apparatus for a terminal, a device and a medium. The technical solution will be described as follows.

According to an aspect of the disclosure, a switching method for a terminal is provided. The method includes:

receiving an indication signaling, in which the indication signaling is configured to indicate a target communication resource; and switching to the target communication resource from a service communication resource based on the indication signaling.

According to an aspect of the disclosure, a switching indicating method for a terminal is provided. The method includes:

sending an indication signaling to the terminal, in which the indication signaling is configured to indicate a target communication resource.

According to an aspect of the disclosure, a terminal is provided. The terminal includes: a processor; a transceiver connected to the processor; a memory for storing instructions executable by the processor; in which the processor is configured to load and execute the instructions to perform the above switching method for a terminal described in the above aspect.

According to an aspect of the disclosure, a network device is provided. The network device includes: a processor; a transceiver connected to the processor; a memory for storing instructions executable by the processor; in which the processor is configured to load and execute the instructions to perform the above switching indicating method for a terminal described in the above aspect.

According to an aspect of the disclosure, a computer readable storage medium storing executable instructions is provided. The executable instructions are loaded and executed to perform the above switching method for a terminal or the above switching indicating method for a terminal described in the above aspects.

According to an aspect of the disclosure, a computer program product is provided. The computer readable storage medium has executable instructions stored therein. The executable instructions are loaded and executed to perform the above switching method for a terminal or the above switching indicating method for a terminal described in the above aspects.

According to an aspect of the disclosure, a chip is provided. The chip is configured to perform the above switching method for a terminal or the above switching indicating method for a terminal described in the above aspects.

BRIEF DESCRIPTION OF THE DRAWINGS

In order to clearly illustrate the technical solution of the embodiments of the disclosure, a brief description of drawings used in the embodiments is given below. Obviously, the drawings in the following descriptions are only part of the embodiments of the disclosure, and for those skilled in the art, other drawings can be obtained according to these drawings without inventive works.

FIG. 4 is a flowchart of a switching method for a terminal according to an embodiment of the disclosure.

FIG. 5 is a flowchart of a switching method for a terminal according to an embodiment of the disclosure.

FIG. 6 is a flowchart of a switching method for a terminal according to an embodiment of the disclosure.

FIG. 7 is a flowchart of a measurement configuring method for a terminal according to an embodiment of the disclosure.

DETAILED DESCRIPTION

In order to make the purpose, technical solution and advantages of the disclosure clearer, implementations of the disclosure will be further described in detail in combination with the accompanying drawings.

Figure 1:
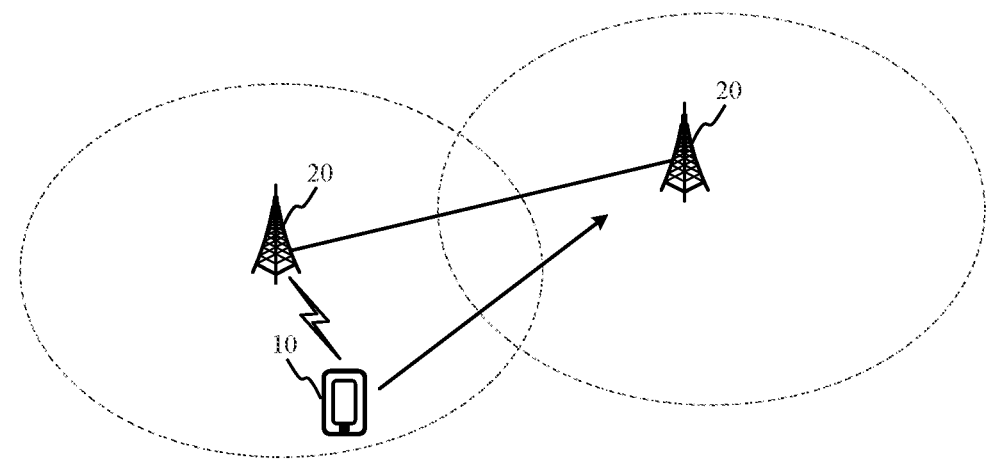
FIG. 1 is a network architecture diagram of a communication system according to an embodiment of the disclosure.

FIG. 1 is a schematic diagram illustrating a system architecture provided in an embodiment of the disclosure. The system architecture may include a terminal 10 and a network device 20.

There may be several terminals 10. One or more terminals 10 may be disposed in a cell managed by each network device 20. The terminal 10 may include various handheld devices, on-board devices, wearable devices, computing devices with wireless communication functions or other processing devices connected to wireless modems, as well as various forms of user equipment (UEs), mobile stations (MSs), etc. For the convenience of description, in the embodiments of the disclosure, the devices mentioned above are collectively referred to as terminals.

The network device 20 is a device deployed in an access network to provide the terminal 10 with a wireless communication function. The network device 20 may include various forms of macro base stations, micro base stations, relay stations, access points, and the like. In systems using different radio access technologies, the names of devices with network device functions may be different, for example, in the 5G NR system, they are called gNodeBs or gNBs. As the communication technology evolves, the designation "network equipment" may change. In a non-terrestrial network (NTN), the network device includes a base station and a satellite, and the content sent by the base station is forwarded to the terminal device through the satellite. For the convenience of description, in the embodiments of the present disclosure, the above-mentioned apparatuses for providing wireless communication functions for the terminals 10 are collectively referred to as network devices.

The "5G NR system" in the embodiments of the present disclosure may also be referred to as a 5G system or an NR system, and the NR system may be a communication system supporting NR-U, and may also be an NTN. But those skilled in the art can understand its meaning. The technical solution described in the embodiments of the present disclosure may be applicable to the 5G NR system, and may also be applicable to the subsequent evolution system of the 5G NR system.

Figure 2:
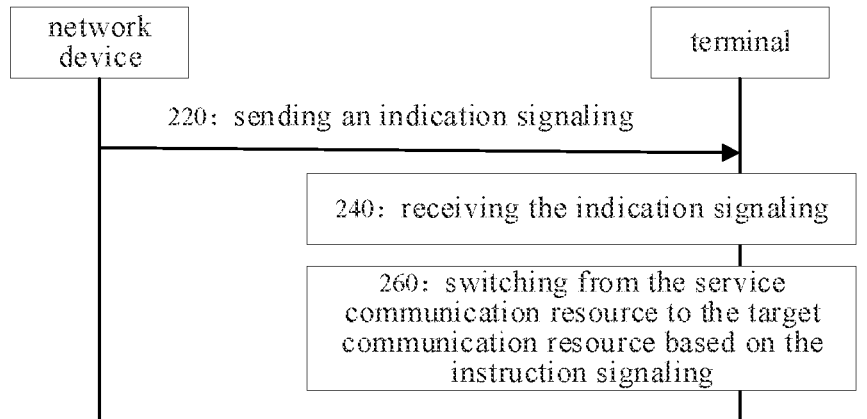
FIG. 2 is a flowchart of a switching method for a terminal according to an embodiment of the disclosure.

FIG. 2 is a flowchart of a switching method for a terminal according to an embodiment of the disclosure. In the embodiment, the method is applied in the communication system described with reference to FIG. 1, for example. The method includes the following.

At block 220, the network device sends an indication signaling to the terminal.

Optionally, the terminal is a terminal in a connected state.

At block 240, the terminal receives the indication signaling. The indication signaling is configured to indicate a target communication resource.

Optionally, the target communication resource includes a target frequency spectrum resource and/or a target beam direction.

The terminal is configured with a signaling beam and a data beam. The signaling beam may be the same as or different from the data beam.

The signaling beam may include but be not limited to at least one of: a beam for receiving a synchronization signal block (SSB), a core resource set (CORESET) #0 (PDCCH used to indicate a location of SIB1), a system information block 1 (SIB1), other system information and a positioning reference signal (PRS) and a beam for transmitting a physical random access channel (PRACH).

The data beam may include but be not limited to a beam for receiving a physical downlink control channel (PDCCH) and a physical downlink shared channel (PDSCH); a beam for receiving a channel state information-reference signal (CSI-RS), a demodulation reference signal (DMRS), a PRS; a beam for transmitting a physical uplink control channel (PDCCH) and a physical uplink shared channel (PDSCH); a beam for transmitting a DMRS, a sounding reference signal (SRS) and a PRACH.

In some embodiments, the indication signaling is configured to indicate a target frequency spectrum resource and/or a target beam direction corresponding to a next switching.

The target frequency spectrum resource includes at least one of a downlink frequency spectrum resource and an uplink frequency spectrum resource.

The target beam direction includes at least one of a downlink beam direction and an uplink beam direction.

At block 260, the terminal switches from the service communication resource to the target communication resource based on the instruction signaling.

The terminal switches from the service frequency spectrum resource to the target frequency spectrum resource based on the instruction signaling:

Or, the terminal switches from the service beam direction to the target beam direction based on the instruction signaling;

Or, the terminal switches from the service frequency spectrum resource to the target frequency spectrum resource based on the instruction signaling, and the terminal switches from the service beam direction to the target beam direction based on the instruction signaling.

Optionally, in the process of switching from a first beam coverage area to a second beam coverage area, it switches from the service frequency spectrum resource to the target frequency spectrum resource based on the instruction signaling, and/or switches from the service beam direction to the target beam direction based on the instruction signaling.

To sum up, in the method provided in the embodiment, the network device sends the instruction signaling to the terminal, and the instruction signaling is configured to instruct the terminal to switch from the service frequency spectrum resource to the target frequency spectrum resource and/or switch from the service beam direction to the target beam direction according to the instruction signaling in case that the satellite moves or the terminal moves, so that a solution of switching between different beam coverage areas is proposed for the terminal in the connected state.

In an optional embodiment based on FIG. 2, the above-mentioned target frequency spectrum resource includes one or two frequency spectrum resources.

In one example, the indication signaling indicates a first frequency spectrum resource. The terminal switches from the service frequency spectrum resource corresponding to the signaling beam and/or the service frequency spectrum resource corresponding to the data beam to the first frequency spectrum resource based on the instruction signaling.

For example, the terminal determines the first frequency spectrum resource based on the instruction signaling, and switches from the service frequency spectrum resource corresponding to the signaling beam to the first frequency spectrum resource. For another example, the terminal determines the first frequency spectrum resource based on the instruction signaling, and switches from the service frequency spectrum resource corresponding to the data beam to the first frequency spectrum resource. For another example, the terminal determines the first frequency spectrum resource based on the instruction signaling, switches from the service frequency spectrum resource corresponding to the signaling beam to the first frequency spectrum resource, and switches from the service frequency spectrum resource corresponding to the data beam to the first frequency spectrum resource.

In another example, the indication signaling simultaneously indicates a first frequency spectrum resource and a second frequency spectrum resource, the first frequency spectrum resource corresponds to the signaling beam, and the second frequency spectrum resource corresponds to the data beam. The terminal switches from the service frequency spectrum resource corresponding to the signaling beam to the first frequency spectrum resource and switches from the service frequency spectrum resource corresponding to the data beam to the second frequency spectrum resource based on the instruction signaling.

Optionally, the target frequency spectrum resource and the service frequency spectrum resource are the same or different. When the target frequency spectrum resource includes one frequency spectrum resource, the service frequency spectrum resource may include one or two frequency spectrum resources. If the service frequency spectrum resource includes only one frequency spectrum resource, the service frequency spectrum resource and the target frequency spectrum resource may be the same or different; if the service frequency spectrum resource includes two frequency spectrum resources, the target frequency spectrum resource may be different from the two frequency spectrum resources of the service frequency spectrum resource, or the target frequency spectrum resource may be the same as one frequency spectrum resource of the service frequency spectrum resource. When the target frequency spectrum resource includes two frequency spectrum resources, the service frequency spectrum resource may include one or two frequency spectrum resources. If the service frequency spectrum resource includes only one frequency spectrum resource, the service frequency spectrum resource may be different from the two frequency spectrum resources in the target frequency spectrum resource, or the service frequency spectrum resource may be the same as one frequency spectrum resource of the target frequency spectrum resource; if the service frequency spectrum resource includes two frequency spectrum resources, the two frequency spectrum resources of the target frequency spectrum resource may be different from the two frequency spectrum resources of the service frequency spectrum resource, or one frequency spectrum resource of the target frequency spectrum resource may be the same as one frequency spectrum resource of the service frequency spectrum resource.

In an optional embodiment based on FIG. 2, the above-mentioned target beam direction includes one or two beam directions.

In one example, the indication signaling indicates a first beam direction. The terminal switches from the service beam direction corresponding to the signaling beam and/or the service beam direction corresponding to the data beam to the first beam direction based on the instruction signaling.

For example, the terminal determines the first beam direction based on the instruction signaling, and switches from the service beam direction corresponding to the signaling beam to the first beam direction. For another example, the terminal determines the first beam direction based on the instruction signaling, and switches from the service beam direction corresponding to the data beam to the first beam direction. For another example, the terminal determines the first beam direction based on the instruction signaling, switches from the service beam direction corresponding to the signaling beam to the first beam direction, and switches from the service beam direction corresponding to the data beam to the first beam direction.

In another example, the indication signaling indicates a first beam direction and a second beam direction at the same time, the first beam direction corresponds to the signaling beam, and the second beam direction corresponds to the data beam. The terminal switches from the service beam direction corresponding to the signaling beam to the first beam direction and switches from the service beam direction corresponding to the data beam to the second beam direction based on the instruction signaling.

Optionally, the target beam direction is the same as or different from the service beam direction. When the target beam direction includes one beam direction, the service beam direction may include one or two beam directions. If the service beam direction includes only one beam direction, the service beam direction and the target beam direction may be the same or different; if the service beam direction includes two beam directions, the target beam direction may be different from the two beam directions of the service beam direction, or the target beam direction may be the same as one beam direction of the service beam direction. When the target beam direction includes two beam directions, the service beam direction may include one or two beam directions. If the service beam direction includes only one beam direction, then the service beam direction may be different from the two beam directions of the target beam direction, or the service beam direction may be the same as one beam direction of the target beam direction; if the service beam direction includes two beam directions, the two beam directions of the target beam direction may be different from the two beam directions of the service beam direction, or one beam direction of the target beam direction may be the same as one beam direction of the service beam direction.

In an optional embodiment based on FIG. 2, the terminal stores a correspondence between frequency spectrum resources and beam directions, and the method further includes at least one of the following steps.

When the indication signaling carries a resource ID of the target frequency spectrum resource, the terminal determines a beam ID of the target beam direction based on the resource ID and the correspondence. That is, according to the resource ID of the target frequency spectrum resource, the terminal can not only determine the target frequency spectrum resource but also determine the target beam direction. Likewise, the target frequency spectrum resource contains one or two frequency spectrum resources.

When the indication signaling carries a beam ID of the target beam direction, the terminal determines a resource ID of the target frequency spectrum resource based on the beam ID and the correspondence. That is, according to the beam ID of the target beam direction, the terminal can determine not only the target beam direction but also the target frequency spectrum resource. Likewise, the target beam direction contains one or two beam directions.

In an optional embodiment based on FIG. 2, since a movement of the satellite has a certain regularity, the indication signaling is configured to indicate N sets of target frequency spectrum resources and/or target beam directions corresponding to N switchings, where N is an integer greater than 1 or equal to 1.

Optionally, when the indication signaling is configured to indicate multiple sets of target frequency spectrum resources and/or target beam directions corresponding to at least two switchings, the indication signaling further includes a time interval between two adjacent switchings.

Optionally, the target frequency spectrum resource of each switching in the N switchings includes one or two frequency spectrum resources, and the target beam direction includes one or two beam directions. The terminal switches from the current service frequency spectrum resource to the target frequency spectrum resource and/or switches from the current service beam direction to the target beam direction according to the instruction signaling. N is a natural number.

When N is 1, it indicates the target frequency spectrum resource and/or the target beam direction for the next switching; when N is greater than 1, such as 2, it indicates the target frequency spectrum resources or target beam directions for the next two switchings: in the first switching, it switches to the first set of target frequency spectrum resources and/or target beam directions, and in the second switching, it switches to the second set of target frequency spectrum resources and/or target beam directions.

When N is greater than 1, the indication signaling is also configured to indicate the time interval between two switchings, that is, a time length for each set of target frequency spectrum resources and/or the target beam directions to be continuously used.

Optionally, each set of parameters may indicate the IDs of this set of parameters, and the IDs of this set of parameters correspond to a frequency spectrum resource ID and a beam direction ID; or each set of parameters may only indicate a frequency spectrum resource ID or a beam direction ID, because there is a correspondence, the terminal can obtain the beam direction ID (abbreviated as beam ID) based on the frequency spectrum resource ID (referred to as resource ID) and the correspondence, or obtain the frequency spectrum resource ID based on the beam direction ID and the correspondence.

In an optional embodiment based on FIG. 2, the above-mentioned indication signaling may be configured by one signaling, or may be configured by at least two signalings.

Figure 3:
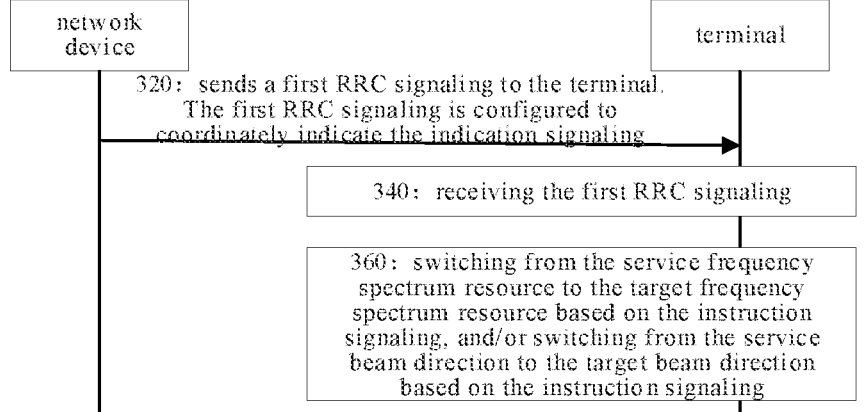
FIG. 3 is a flowchart of a switching method for a terminal according to an embodiment of the disclosure.

For the case where the indication signaling is configured through RRC:

FIG. 3 shows a flowchart of a switching method for a terminal provided by an embodiment of the present disclosure. In the embodiment, the method is applied to the communication system shown in FIG. 1, for example. The method includes the following.

At block 320, the network device sends a first RRC signaling to the terminal. The first RRC signaling carries the indication signaling.

Optionally, the terminal is a terminal in a connected state.

Optionally, the first RRC signaling is a handover command (HO command), and the handover command carries at least one of the followings:

a resource identity (ID) of the first frequency spectrum resource;

a resource ID of the second frequency spectrum resource;

a beam ID of the first beam direction:

a beam ID for the second beam direction.

Optionally, the resource ID includes at least one of a component carrier identity (CCID), a bandwidth part identity (BWP ID) and a frequency band ID. The beam ID includes a reference signal ID.

In an example, the first RRC signaling does not carry a physical cell identifier (PCI) indication field; or the first RRC signaling carries a PCI indication field and the PCI indication field is NULL or a PCI carried in the PCI indication field is the same as a PCI of a current beam coverage area; or the first RRC signaling carries a PCI indication field and the PCI indication field is not NULL. For example, when the switching scenario is an intra-cell switching scenario, that is, the physical cell identifiers before and after the switching are the same, the first RRC signaling does not carry the PCI indication field, or the first RRC signaling carries the PCI indication field and the PCI indication field is NULL, the terminal implicitly learns that the PCI of the second beam coverage area after the switching is the same as the PCI of the current first beam coverage area; or the first RRC signaling carries the PCI indication field and the PCI indication field carries the PCI which is the same as that of the current first beam coverage area, the terminal explicitly learns that the PCI of the second beam coverage area after the switching is the same as the PCI of the current first beam coverage area. When the switching scenario is an inter-cell switching scenario, that is, the physical cell identifiers before and after the switching are different, the first RRC signaling carries the PCI indication field and the PCI indication field is not NULL, and the PCI carried in the PCI indication field is different from the PCI of the current first beam coverage area.

In an example, the first RRC signaling does not carry a satellite ID indication field, or, the first RRC signaling carries a satellite ID indication field and the satellite ID indication field is NULL or a satellite ID carried in the satellite ID indication field is the same as the satellite ID of the current first beam coverage area; or the first RRC signaling carries a satellite ID indication field and the satellite ID indication field is not NULL. For example, when the switching scenario is an intra-satellite switching scenario, that is, the satellite IDs before and after the switching are the same, the first RRC signaling does not carry the satellite ID indication field, or the first RRC signaling carries the satellite ID indication field and the satellite ID indication field is NULL, the terminal implicitly knows that the satellite of the second beam coverage area after the switching is the same as the satellite of the current first beam coverage area; or the first RRC signaling carries the satellite ID indication field and the satellite ID carried in the satellite ID indication field is the same as the satellite ID of the current first beam coverage area, the terminal explicitly learns that the satellite ID of the second beam coverage area after the switching is the same as the satellite ID of the current first beam coverage area. When the switching scenario is an inter-satellite switching scenario, that is, the satellite IDs before and after the switching are different, the first RRC signaling carries the satellite ID indication field and the satellite ID indication field is not NULL, and the satellite ID carried in the satellite ID indication field is different from the satellite ID of the current first beam coverage area.

In an example, the first RRC signaling also carries a new timing advance (TA). The TA is used to indicate a TA absolute value, or a TA relative value. The relative value may be a relative value with regard to the TA corresponding to the current first beam coverage area, or a relative value with regard to a public TA. Optionally, the TA may also be carried in a second RRC signaling and sent. The value of the TA may be different for different second beam coverage areas.

In an example, the first RRC signaling further carries a T duration, the T duration is used to instruct the terminal to complete the switching within the T duration after receiving the first RRC signaling. That is, starting from the first symbol or time slot after time T, the terminal will use the target frequency spectrum resource and/or the target beam direction to send and receive signaling and/or data. Optionally, the T duration is in unit of symbols or time slots. The SCS takes the SCS of a signaling frequency spectrum resource in the target frequency spectrum resource as a reference. The T duration may also be carried in the second RRC signaling and sent, and the value of the T duration may be different for different second beam coverage areas.

In an example, the first RRC signaling is further configured to indicate random access related information to the terminal. That is, the first RRC signaling indicates whether the terminal needs to perform a random-access procedure, which schematically includes the following indication methods.

a) Explicitly indicate whether a random-access procedure is required.

b) Implicitly indicate whether a random-access procedure needs to be performed. For example, in a switching scenario with the same physical cell ID or the same satellite ID before and after switching, the random-access procedure may not be performed; otherwise, in a switching scenario with different physical cell IDs or different satellite IDs before and after switching, a random-access procedure needs to be performed.

c) Implicitly indicate whether a random-access procedure needs to be performed. For example, if the TA and the T duration are indicated, the random-access procedure is not required; if these two kinds of information are not indicated, the random-access procedure needs to be performed. Even in the switching scenario with the same physical cell ID or the same satellite ID before and after the switching, the random-access procedure needs to be performed when the TA and the T duration are not indicated. The random-access procedure can be a contention-based random-access procedure or a non-contention-based random-access procedure. If the first RRC signaling indicates a random-access preamble, it is a non-contention-based random-access procedure, otherwise, it is a contention-based random-access procedure.

In one example, the first RRC signaling is also configured to indicate an ID of the second beam coverage area. The second beam coverage area is the target beam coverage area after the switching. If the ID of the second beam coverage area can have a one-to-one correspondence with the above information, only the ID of the second beam coverage area needs to indicate, and the target frequency spectrum resource, target beam, physical cell ID, and satellite ID, TA, T, whether the random-access procedure needs to be performed, etc. can be known accordingly. Alternatively, there is a one-to-one correspondence between the ID of the second beam coverage area and a part of the above information, so the information with the one-to-one correspondence may not be indicated. Or the ID of a reference signal used for the beam measurement is the ID of the second beam coverage area, because the satellite uses different beams to send different reference signals, and each reference signal ID is different. The reference signal ID determines the ID of the second beam coverage area. Therefore, it is possible to only indicate the ID of the target beam, and the corresponding target frequency domain resource can be known accordingly.

At block 340, the terminal receives the first RRC signaling, and the first RRC signaling carries the target frequency spectrum resource and/or the target beam direction.

According to the information carried in the first RRC signaling, the terminal obtains at least one of the ID of the second beam coverage area, the target frequency spectrum resource, the target beam, the physical cell identifier, the satellite ID, the TA, the T duration, and whether the random-access procedure is required. All or part of the above information is indicated explicitly. Optionally, all or part of the above information is indicated implicitly.

At block 360, the terminal switches from the service frequency spectrum resource to the target frequency spectrum resource based on the instruction signaling, and/or switches from the service beam direction to the target beam direction based on the instruction signaling.

In an example, when the first RRC signaling carries the resource ID of the first frequency spectrum resource, the service frequency spectrum resource corresponding to the signaling beam is switched to the first frequency spectrum resource, and/or the service frequency spectrum resource corresponding to the data beam is switched to the first frequency spectrum resource.

In an example, when the first RRC signaling carries the resource ID of the first frequency spectrum resource and the resource ID of the second frequency spectrum resource, the service frequency spectrum resource corresponding to the signaling beam is switched to the first frequency spectrum resource, and the service frequency spectrum resource corresponding to the data beam is switched to the second frequency spectrum resource.

In an example, when the first RRC signaling carries the beam ID of the first beam direction, the service beam direction corresponding to the signaling beam is switched to the first beam direction, and/or the service beam direction corresponding to the data beam is switched to the first beam direction.

In an example, when the first RRC signaling carries the beam ID of the first beam direction and the beam 1D of the second beam direction, the service beam direction corresponding to the signaling beam is switched to the first beam direction, and the service beam direction corresponding to the data beam is switched to the second beam direction.

In one example, the terminal stores a correspondence between frequency spectrum resources and beam directions. When the first RRC signaling carries the resource ID of the first frequency spectrum resource, the beam ID of the first beam direction is determined according to the correspondence. The terminal switches from the service frequency spectrum resource corresponding to the signaling beam to the first frequency spectrum resource, and/or switches from the service frequency spectrum resource corresponding to the data beam to the first frequency spectrum resource; and/or the terminal switches from the service beam direction corresponding to the signaling beam to the first beam direction, and/or switches from the service beam direction corresponding to the data beam to the first beam direction.

When the first RRC signaling carries the resource ID of the first frequency spectrum resource and the resource ID of the second frequency spectrum resource, the beam ID of the first beam direction and the beam ID of the second beam direction are determined according to the correspondence. The terminal switches from the service frequency spectrum resource corresponding to the signaling beam to the first frequency spectrum resource, and/or switches from the service frequency spectrum resource corresponding to the data beam to the second frequency spectrum resource; and/or the terminal switches from the service beam direction corresponding to the signaling beam to the first beam direction, and switches from the service beam direction corresponding to the data beam to the second beam direction.

When the first RRC signaling carries the beam ID of the first beam direction, the resource ID of the first frequency spectrum resource is determined according to the correspondence. The terminal switches from the service beam direction corresponding to the signaling beam to the first beam direction, and/or switches from the service beam direction corresponding to the data beam to the first beam direction; and/or the terminal switches from the service frequency spectrum resource corresponding to the signaling beam to the first frequency spectrum resource, and/or, switches from the service frequency spectrum resource corresponding to the data beam to the first frequency spectrum resource.

When the first RRC signaling carries the beam ID of the first beam direction and the beam ID of the second beam direction, the resource ID of the first frequency spectrum resource and the resource ID of the second frequency spectrum resource are determined according to the correspondence. The terminal switches from the service beam direction corresponding to the signaling beam to the first beam direction, and/or switches from the service beam direction corresponding to the data beam to the second beam direction; and/or the terminal switches from the service frequency spectrum resource corresponding to the signaling beam to the first frequency spectrum resource, and switches from the service frequency spectrum resource corresponding to the data beam to the second frequency spectrum resource.

In an example, after T duration from receiving the first RRC signaling, the terminal switches from the service frequency spectrum resource to the target frequency spectrum resource according to the instruction signaling, and/or switches from the service beam direction to the target beam direction according to the instruction signaling. That is, starting from the first symbol or time slot after time T, the terminal will use the target frequency spectrum resource and/or the target beam direction to send and receive signaling and/or data.

To sum up, in the method provided in the embodiment, by using the RRC signaling to send the instruction signaling, such as the HO command, to the terminal, the switching of the frequency domain resources and/or the beam directions of the signaling beam and/or the data beam can be completed when the terminal needs to switch from the first beam coverage area to the second beam coverage area.

For the case where the indication signaling is configured through at least two kinds of signalings:

FIG. 4 shows a flowchart of a switching method for a terminal provided by an embodiment of the present disclosure. In the embodiment, the method is applied to the communication system shown in FIG. 1, for example. The method includes the following.

At block 420, the network device sends at least two kinds of signalings to the terminal, and the at least two kinds of signalings are configured to coordinately indicate target information.

The at least two kinds of signalings (or at least two sets) are configured to coordinately indicate the target information, and the target information includes at least one kind of the four kinds of information: a target signaling frequency spectrum resource, a target data frequency spectrum resource, a target signaling beam, and a target data beam.

Optionally, the at least two kinds of signalings include a first signaling and a second signaling. Depending on the type of signaling, at least the following four situations are included.

1, The first signaling includes a fourth RRC signaling, and the second signaling includes a MAC signaling.
  2, The first signaling includes a fourth RRC signaling, and the second signaling includes a DCI signaling.
  3, The first signaling includes a fourth RRC signaling, and the second signaling includes a MAC signaling and a DCI signaling.
  4, The first signaling includes a fourth RRC signaling and a MAC signaling, and the second signaling includes a DCI signaling.

Optionally, the first information in the target information is jointly indicated by the first signaling and the second signaling; the remaining information other than the first information in the target information is indicated by the first signaling. The first information includes one or two or three or four of the target signaling frequency spectrum resource, the target data frequency spectrum resource, the target signaling beam, and the target data beam.

Optionally, the second signaling includes the same second signaling, and the same second signaling is configured to indicate at least two kinds of information in the target information; or, the second signaling includes multiple second signalings, and the multiple second signalings are respectively configured to indicate one kind of information in the target information.

Optionally, the first signaling includes the same first signaling, and the same first signaling is configured to indicate at least two kinds of information in the target information; or, the first signaling includes multiple first signalings, and the multiple first signalings are respectively configured to indicate one kind of information in the target information.

For the first case above, take the first signaling including the fourth RRC signaling and the second signaling including the MAC signaling as an example:

In the four kinds of target information including the target signaling frequency spectrum resource, the target data frequency spectrum resource, the target signaling beam, and the target data beam, at least one kind of target information is jointly indicated by the MAC signaling and the fourth RRC signaling, and the remaining target information is indicated by the fourth RRC signaling.

Optionally, the fourth RRC signaling and the MAC signaling carry ID information, and the ID information includes at least one of the resource ID of the target signaling frequency spectrum resource, the resource ID of the target data frequency spectrum resource, the beam ID of the target signaling beam, the beam ID of the target data beam. The resource information corresponding to the resource ID and the reference signal information corresponding to the beam ID are both indicated in advance by the second RRC signaling shown in FIG. 5 and/or the third RRC signaling shown in FIG. 6, or by the fourth RRC signaling.

Optionally, for the four kinds of information including the target signaling frequency spectrum resource (that is, the first frequency spectrum resource), the target data frequency spectrum resource (that is, the second frequency spectrum resource or the first frequency spectrum resource), the target signaling beam (that is, the first beam direction), and the target data beam (i.e., the second beam direction or the first beam direction), if more than one kind of target information is indicated by a MAC signaling, it can be indicated by the same MAC signaling or different MAC signalings. If the same MAC signaling indicates at least two kinds of target information, for example, one MAC signaling indicates the target signaling beam and the target data beam, then different bits in the MAC correspond to different reference signal IDs, and if the bit is "1", it indicates that the beam direction of the reference signal ID corresponding to the bit is activated as the target beam direction. When two bits are "1", it indicates that the beam directions corresponding to two reference signal IDs are activated as the target beam direction. Specifically, which is used for the signaling beam and which is used for the data beam can be determined according to the second RRC signaling or a default rule. For example, the second RRC signaling configures two beam sets in advance, one is a signaling beam set, and the other is a data beam set. Both beam sets provide reference signal IDs. Then, among the two reference signal IDs indicated by the MAC signaling, the reference signal ID belonging to the signaling beam set is used for the signaling beam, and the reference signal ID belonging to the data beam set is used for the data beam. For another example, the default rule indicates that a high-order bit of the bits in the MAC signaling indicates that used for the signaling beam, while the low-order bit indicates that used for the data beam, or vice versa. Or the fourth RRC signaling gives a beam group ID, each beam group contains a signaling beam ID and a data beam ID, and the MAC signaling directly activates the beam group ID to indicate the signaling beam ID and the data beam ID.

For another example, the same MAC signaling indicates the target signaling frequency spectrum and the target data frequency spectrum. Then, different bits in the MAC correspond to different resource IDs, and when the bit is "1", it indicates that the frequency spectrum resource of the resource ID corresponding to the bit is activated as the target frequency spectrum resource. When two bits are "1", it indicates that the frequency spectrum resources corresponding to the two resource IDs are activated as the target frequency spectrum resource. Specifically, which is used for the signaling beam and which is used for the data beam can be determined according to the second RRC signaling or a default rule. For example, the second RRC signaling configures two resource sets in advance, one is a signaling resource set, and the other is a data resource set. Both resource sets provide resource IDs. Then, among the two resource IDs indicated by MAC signaling, the resource ID belonging to the signaling resource set is used for the signaling beam, and the resource ID belonging to the data resource set is used for the data beams. For another example, the default rule indicates that the high-order bit of the bits in the MAC signaling indicates that used for the signaling beam, and the low-order bit indicates that used for the data beam, or vice versa. Or the fourth RRC signaling gives a frequency spectrum group ID, each frequency spectrum group contains a signaling frequency spectrum ID and a data frequency spectrum ID, and the MAC signaling directly activates the frequency spectrum group ID to indicate the signaling frequency spectrum ID and the data frequency spectrum ID.

Optionally, if more than one kind of target information is indicated by the fourth RRC signaling, it may be indicated by the same fourth RRC signaling or different fourth RRC signalings. If the same fourth RRC signaling indicates at least two kinds of target information, for example, one fourth RRC signaling indicates the target signaling beam and the target data beam, then different indication fields in the fourth RRC signaling correspond to different beam directions, that is, there is a one-to-one correspondence between (i) the indication fields and (ii) the target signaling beam and the target data beam.

For another example, the same fourth RRC signaling indicates the target signaling frequency spectrum and the target data frequency spectrum. Then, different indication fields in the fourth RRC signaling correspond to different frequency spectrum resources, that is, there is a one-to-one correspondence between (i) the indication fields and (ii) the target signaling frequency spectrum and the target data frequency spectrum.

Optionally, the fourth RRC signaling is a handover command (HO command). The above resource ID includes: at least one of a CCID, a BWPID and a frequency band ID. The beam ID includes a reference signal ID. The reference signal ID includes at least one of an SSB ID, a CSI-RS ID, a PRS ID, and an SRS ID.

In an example, the first signaling and the second signaling do not carry a PCI indication field; or, the first signaling and the second signaling carry a PCI indication field and the PCI indication field is NULL; or, at least one of the first signaling and the second signaling carries a PCI indication field and the PCI indication field is not NULL or a PCI carried in the PCI indication field is the same as a PCI of the current first beam coverage area. For example, when the switching scenario is an intra-cell switching scenario, that is, the physical cell identifiers before and after the switching are the same, the first signaling and the second signaling do not carry the PCI indication field, or, at least one of the first signaling and the second signaling carries the PCI indication field and the PCI indication field is NULL, the terminal implicitly learns that the PCI of the second beam coverage area after the switching is the same as the PCI of the current first beam coverage area; or at least one of the first signaling and the second signaling carries the PCI indication field and the PCI carried in the PCI indication field is the same as the PCI of the current first beam coverage area, the terminal explicitly learns that the PCI of the second beam coverage area after the switching is the same as the PCI of the current first beam coverage area. When the switching scenario is an inter-cell switching scenario, that is, the physical cell identifiers before and after the switching are different, at least one of the first signaling and the second signaling carries the PCI indication field and the PCI indication field is not NULL, the PCI carried in the PCI indication field is different from the PCI of the current first beam coverage area.

In an example, the first signaling and the second signaling do not carry a satellite ID indication field; or, the first signaling and the second signaling carry a satellite ID indication field and the satellite ID indication field is NULL or a satellite ID carried in the satellite ID indication field is the same as a satellite ID of the current first beam coverage area or, at least one of the first signaling and the second signaling carries a satellite ID indication field and the satellite ID indication field is not NULL. For example, when the switching scenario is an intra-satellite switching scenario, that is, the satellite IDs before and after the switching are the same, the first signaling and the second signaling do not carry the satellite indication field, or, the first signaling and the second signaling carry the satellite indication field and the satellite indication field is NULL, the terminal implicitly knows that the satellite of the second beam coverage area after the switching is the same as the satellite of the current first beam coverage area; or at least one of the first signaling and the second signaling carries the satellite ID indication field and the satellite ID carried in the satellite ID indication field is the same as the satellite ID of the current first beam coverage area, the terminal explicitly learns that the satellite ID of the second beam coverage area after the switching is the same as the satellite ID of the current first beam coverage area. When the switching scenario is an inter-satellite switching scenario, that is, the satellite IDs before and after the switching are different, at least one of the first signaling and the second signaling carries the satellite indication field and the satellite indication field is not NULL, the satellite ID carried in the satellite ID indication field is different from the satellite ID of the current first beam coverage area.

In an example, at least one of the first signaling and the second signaling further carries a new timing advance (TA). The TA is used to indicate a TA absolute value, or a TA relative value, and the relative value may be a relative value with regard to the TA corresponding to the current first beam coverage area, or a relative value with regard to the public TA. Optionally, the TA may also be carried in the second RRC signaling and sent, but for different second beam coverage areas, the TA may have different values.

In an example, at least one of the first signaling and the second signaling further carries a T duration, the T duration is used to instruct the terminal to complete the switching within the T duration after receiving the first signaling and the second signaling. That is, starting from the first symbol or time slot after time T, the terminal will use the target frequency spectrum resource and/or the target beam direction to send and receive signaling and/or data. Optionally, the T duration is in unit of symbols or time slots. The SCS takes the SCS of the signaling frequency spectrum resource in the target frequency spectrum resource as a reference. The T duration may also be carried in the second RRC signaling and sent, but for different second beam coverage areas, the T duration may have different values.

In an example, at least one of the first signaling and the second signaling is further configured to indicate random access related information to the terminal. That is, the first signaling and the second signaling indicate whether the terminal needs to perform a random-access procedure, which schematically includes the following indication methods.

a) Explicitly indicate whether a random-access procedure needs to be performed.

b) Implicitly indicate whether a random-access procedure needs to be performed. For example, in a switching scenario with the same physical cell ID or the same satellite ID before and after switching, the random-access procedure may not be performed; otherwise, in a switching scenario with different physical cell IDs or different satellite IDs before and after switching, a random-access procedure needs to be performed.

c) Implicitly indicate whether a random-access procedure needs to be performed. For example, if the TA and the T duration are indicated, the random-access procedure is not required; if these two kinds of information are not indicated, the random-access procedure needs to be performed. Even in the switching scenario with the same physical cell ID or the same satellite ID before and after the switching, the random-access procedure needs to be performed when the TA and the T duration are not indicated. The random-access procedure can be a contention-based random-access procedure or a non-contention-based random-access procedure. If the fourth RRC signaling indicates a random-access preamble, it is a non-contention-based random-access procedure; otherwise, it is a contention-based random-access procedure.

d) Implicitly indicate whether a random-access procedure needs to be performed. For example, if the MAC signaling only indicates one kind of target information in the four kinds of target information, no random-access procedure needs to be performed. If the MAC signaling indicates more than one kind of target information in the four kinds of target information, a random-access procedure needs to be performed.

In one example, at least one of the first signaling and the second signaling is also configured to indicate an ID of the second beam coverage area. The second beam coverage area is the target beam coverage area after the switching. If the ID of the second beam coverage area can have a one-to-one correspondence with the above information, only the ID of the second beam coverage area needs to indicate, and the target frequency spectrum resource, target beam, physical cell ID, and satellite ID, TA, T, whether the random-access procedure needs to be performed, etc. can be known accordingly. Alternatively, there is a one-to-one correspondence between the ID of the second beam coverage area and a part of the above information, so the information with the one-to-one correspondence may not be indicated. Or the ID of a reference signal used for the beam measurement is the ID of the second beam coverage area, because the satellite uses different beams to send different reference signals, and each reference signal ID is different. The reference signal ID determines the ID of the second beam coverage area. Therefore, it is possible to only indicate the ID of the target beam, and the corresponding target frequency domain resource can be known accordingly.

For the second case above, take the first signaling including the fourth RRC signaling and the second signaling including the DCI signaling as an example:

It is sufficient to replace the MAC signaling in the above example with DCI, which is not repeated here.

For the third case above, take the first signaling including the fourth RRC signaling and the second signaling including the MAC signaling and the DCI signaling as an example:

In the four kinds of target information including the target signaling frequency spectrum resource, the target data frequency spectrum resource, the target signaling beam, and the target data beam, at least one kind of target information is jointly indicated by the fourth RRC signaling, the MAC signaling and the DCI signaling, and the remaining target information is indicated by the fourth RRC signaling.

Optionally, the fourth RRC signaling, the DCI signaling, and the MAC signaling carry ID information, and the ID information includes at least one of the resource ID of the target signaling frequency spectrum resource, the resource ID of the target data frequency spectrum resource, the beam ID of the target signaling beam, the beam ID of the target data beam. The resource information corresponding to the resource ID and the reference signal information corresponding to the beam ID are both indicated in advance by the second RRC signaling and/or the third RRC signaling shown in FIG. 5 and FIG. 6, or by the fourth RRC signaling.

Optionally, the fourth RRC signaling and at least one of the first RRC signaling, the second RRC signaling, and the third RRC signaling may be the same RRC signaling or different RRC signalings.

Optionally, if more than one piece of target information is indicated by a DCI signaling, it may be indicated by the same DCI signaling or different DCI signalings. If the same DCI signaling indicates at least two kinds of target information, it can be indicated by the MAC signaling coordinately. For example, the frequency spectrum resource used by the second beam coverage area is BWP #0 and the beam direction used is SSB #0, then the MAC signaling provides a mapping relationship, for example, the mapping relationship indicates that, a meaning of the 3-bit DCI bit codeword 001 is that the frequency spectrum resource is BWP #0 and the beam direction is SSB #0. Or the signaling beam direction used by the second beam coverage area is SSB #1 and the data beam direction is CSI-RS #0, then the MAC signaling provides a mapping relationship, for example, the mapping relationship indicates that, a meaning of the 3-bit DCI bit code word 010 is that the signaling beam direction is SSB #1 and the data beam direction is CSI-RS #0.

Optionally, if there is more than one piece of target information indicated by the fourth RRC signaling, it may be indicated by the same fourth RRC signaling or different fourth RRC signalings. Or they are called fourth RRC signaling, but the fourth RRC signaling may actually include multiple RRC messages.

Optionally, at least one of the above-mentioned physical cell identifier, the satellite ID, the TA, the T duration, whether a random-access procedure needs to be performed, and the ID of the second beam coverage area can also be indicated by at least one of the fourth RRC signaling, the DCI signaling and the MAC signaling. In some embodiments, the fourth RRC signaling is preferentially selected for indication. In other embodiments, a combination of at least two kinds of signalings among the fourth RRC signaling, the DCI signaling, and the MAC signaling is used for coordinated indication. The T duration is configured to indicate that the T duration after receiving the DCI signaling (second signaling) is the time of completing the switching. When there are multiple DCI signalings, the T duration after receiving the last DCI signaling is the time of completing the switching.

Optionally, the DCI is any one of a common DCI, a group common DCI, or a UE specific DCI.

For the fourth case above, take the first signaling including the fourth RRC signaling and the MAC signaling and the second signaling including the DCI signaling as an example:

In the four kinds of information including the target signaling frequency spectrum resource, the target data frequency spectrum resource, the target signaling beam, and the target data beam, at least one kind of target information is jointly indicated by the fourth RRC signaling, the MAC signaling and the DCI signaling, and the remaining target information is indicated coordinately by the fourth RRC signaling and the MAC signaling.

Optionally, the fourth RRC signaling, the DCI signaling, and the MAC signaling carry ID information, and the ID information includes at least one of the resource ID of the target signaling frequency spectrum resource, the resource ID of the target data frequency spectrum resource, the beam ID of the target signaling beam, and the beam ID of the target data beam. The resource information corresponding to the resource ID and the reference signal information corresponding to the beam ID are both indicated in advance by the second RRC signaling and/or the third RRC signaling shown in FIG. 5 and FIG. 6, or by the fourth RRC signaling.

Optionally, the fourth RRC signaling and at least one of the first RRC signaling, the second RRC signaling, and the third RRC signaling may be the same RRC signaling or different RRC signalings.

Optionally, if more than one piece of target information is indicated by a DCI signaling, it may be indicated by the same DCI signaling or different DCI signalings. If the same DCI signaling indicates at least two kinds of target information, it can be indicated by the MAC signaling coordinately. For example, the frequency spectrum resource used by the second beam coverage area is BWP #0 and the beam direction used is SSB #0, then the MAC signaling provides a mapping relationship, for example, the mapping relationship indicates that, a meaning of the 3-bit DCI bit codeword 001 is that the frequency spectrum resource is BWP #0 and the beam direction is SSB #0. Or the signaling beam direction used by the second beam coverage area is SSB #1 and the data beam direction is CSI-RS #0, then the MAC signaling provides a mapping relationship, for example, the mapping relationship indicates that, a meaning of the 3-bit DCI bit code word 010 is that the signaling beam direction is SSB #1 and the data beam direction is CSI-RS #0.

Optionally, if there is more than one piece of target information indicated by the fourth RRC signaling and the MAC signaling, the fourth RRC signaling may be the same fourth RRC signaling or different fourth RRC signalings, and the MAC signaling may be the same MAC signaling or different MAC signalings. If the same MAC signaling indicates at least two kinds of target information, the fourth RRC signaling can be used for coordinated indication. For example, the frequency spectrum resource used by the second beam coverage area is BWP #0 and the beam direction is SSB #0, then the fourth RRC signaling gives the mapping relationship. For example, if the parameter group ID is 0, it indicates that the parameter in the parameter group is that the frequency spectrum resource is BWP #0 and the beam direction is SSB #0. If the bit corresponding to the parameter group ID 0 in the MAC signaling is set to "1", it indicates that the parameter group whose parameter group ID is 0, that is, indicates that the frequency spectrum resource is BWP #0 and the beam direction is SSB #0.

Optionally, at least one of the above-mentioned physical cell identifier, the satellite ID, the TA, the T duration, whether a random-access procedure needs to be performed, and the ID of the second beam coverage area can also be indicated by at least one of the fourth RRC signaling, the DCI signaling and the MAC signaling. In some embodiments, the fourth RRC signaling is preferentially selected for indication. In other embodiments, a combination of at least two kinds of signalings among the fourth RRC signaling, the DCI signaling, and the MAC signaling is used for coordinated indication. The T duration is configured to indicate that the T duration after receiving the DCI signaling (second signaling) is the time of completing the switching. When there are multiple DCI signalings, the T duration after receiving the last DCI signaling is the time of completing the switching.

Optionally, the DCI is any one of a common DCI, a group common DCI, or a UE specific DCI.

At block 440, the terminal receives at least two kinds of signalings, and the at least two kinds of signalings carry the target frequency spectrum resource and/or the target beam direction.

At block 460, the terminal switches from the service frequency spectrum resource to the target frequency spectrum resource according to the instruction signaling, and/or switches from the service beam direction to the target beam direction according to the instruction signaling.

To sum up, in the method provided in the embodiment, by using at least two kinds of signalings to coordinately indicate the target information, multiple kinds of signalings can be used to achieve more reliable communication quality, and reduce the information amount that needs to be indicated in each kind of signaling.

In an optional embodiment based on FIG. 3 or FIG. 4, the above method further includes the following, as shown in FIG. 5.

At block 520, the network device sends a second RRC signaling to the terminal.

In the case that the resource ID of the first RRC signaling includes the CCID, the second RRC signaling carries CC information corresponding to the CCID. The CC information corresponding to each CCID includes, but is not limited to, at least one of a frequency point position, a bandwidth, a subcarrier spacing (SCS) and a cyclic prefix (CP) of the CC.

In the case that the resource ID of the first RRC signaling includes the BWP ID, the second RRC signaling carries BWP information corresponding to the BWP 1D. The BWP information of each BWP ID includes, but is not limited to, at least one of a frequency point location, a bandwidth, an SCS, and a CP of the BWP.

In the case that the resource ID of the first RRC signaling includes a frequency band ID, the second RRC signaling carries frequency band information corresponding to the frequency band ID. The frequency band information of each frequency band ID includes, but is not limited to: at least one of a frequency point position, a bandwidth, an SCS and a CP of the frequency band.

The second RRC signaling is a basis of the first RRC signaling, so generally the second RRC signaling is sent to the terminal before the first RRC signaling (but the possibility of sending the second RRC signaling after or at the same time as the first RRC signaling is not excluded). For example, the second RRC signaling is given by a switching measurement configuration signaling, then after the terminal completes the switching measurement and reports a measurement result to the base station, the base station determines the target frequency spectrum resource and the target beam direction according to the measurement result, and notifies the terminal of the target frequency spectrum resource and the target beam direction through the first RRC signaling.

At block 540, the terminal receives the second RRC signaling sent by the network device.

Optionally, the fourth RRC signaling and at least one of the first RRC signaling and the second RRC signaling are the same RRC signaling or different RRC signalings.

To sum up, in the method provided in the embodiment, the network device sends the second RRC signaling to the terminal, so that the correspondence between the ID of the target frequency spectrum resource and the frequency domain information can be transmitted to the terminal in advance, thereby reducing the data amount to be carried in the first RRC signaling.

In an optional embodiment based on FIG. 3 or FIG. 4, the above method further includes the following, as shown in FIG. 6.

At block 620, the network device sends a third RRC signaling to the terminal.

In the case where the beam ID includes a reference signal ID, such as at least one of an SSB ID, channel state information (Channel-Slate Information Reference Signal, CSI-RS) ID, a sounding reference signal (SRS) ID, a positioning reference signal (PRS) ID, etc.

In addition to the reference signal ID, the beam ID may also add a PCI or a transmission reception point (TRP) ID or a satellite ID to indicate which cell or which TRP or which satellite the reference signal comes from.

The third RRC signaling is used to indicate the information of the reference signal corresponding to the beam ID, including a time-frequency resource location of the reference signal, a port identifier, and the like. The third RRC signaling may also be a beam measurement configuration signaling. Similarly, the third RRC signaling is also sent to the terminal before the first RRC signaling (but the possibility of sending the third RRC signaling after or simultaneously with the first RRC signaling is not excluded).

Optionally, the third RRC signaling and the second RRC signaling may be the same RRC signaling, or different RRC signalings.

At block 640, the terminal receives the third RRC signaling sent by the network device.

Optionally, the fourth RRC signaling and at least one of the first RRC signaling and the third RRC signaling are the same RRC signaling or different RRC signalings.

To sum up, in the method provided in the embodiment, the network device sends the third RRC signaling to the terminal, so that the correspondence between the beam ID of the target beam direction and the reference signal information can be transmitted to the terminal in advance, thereby reducing the data amount to be carried in the first RRC signaling.

FIG. 7 shows a flowchart of a measurement configuring method for a terminal provided by an embodiment of the present disclosure. The method may be performed by the communication system described in FIG. 1. The method includes the following.

At block 720, the network device sends a measurement configuration of an adjacent beam coverage area to the terminal.

The measurement configuration is configured to indicate performing a measurement on the adjacent beam coverage area. Optionally, the measurement configuration includes at least one of the following configurations:

Physical Cell Identifier of the Adjacent Beam Coverage Area

Optionally, Intra-cell refers to a cell whose physical cell identifier is the same as that of the current first beam coverage area, so the PCI and/or satellite ID need not to be indicated for such first beam coverage area. Optionally, the measurement configuration includes a cell identifier of an adjacent beam coverage area of the inter-cell, that is, PCI and/or satellite ID.

Satellite Identifier of the Adjacent Beam Coverage Area

Optionally, the measurement configuration also includes intra-satellite information. Intra-satellite means that the adjacent beam coverage area and the first beam coverage area are under a coverage of the same satellite, and at least the satellite ID is the same, so there is no need to indicate the satellite ID. Optionally, the measurement configuration also includes inter-satellite information. Inter-satellite means that the adjacent beam coverage area and the first beam coverage area belong to different satellites.

Frequency Domain Resource Information of the Adjacent Beam Coverage Area

The frequency domain resource information includes at least one of CC and BWP.

The frequency domain resource information includes at least one of the followings: a frequency domain resource ID, a frequency point position of the frequency domain resource, a bandwidth of the frequency domain resource, a subcarrier spacing (SCS), and a cyclic prefix (CP).

The frequency domain resource ID is the CC ID or the BWP ID; the frequency point position and the bandwidth of the frequency domain resource include the CC position and the bandwidth or include the BWP position and bandwidth.

If a frequency domain resource reuse factor is 1, that is, the frequency domain resources are the same, the frequency domain resource may not be indicated; if the frequency domain resource reuse factor is greater than 1, that is, the frequency domain resources are different, the frequency domain resource also needs to be indicated. The frequency domain resource information is: CC ID, CC position and bandwidth, subcarrier spacing, CP; and/or BWP ID, BWP position and bandwidth, subcarrier spacing, CP.

Satellite Information

BWP Information

In one example, the measurement configuration includes information on the adjacent beam coverage area of the intra-cell. The measurement configuration also includes intra-BWP information. Intra-BWP means that the frequency domain resources of the adjacent beam coverage area and the first beam coverage area are the same, and the frequency domain resource may not be indicated. In one example, the measurement configuration also includes inter-BWP information. Inter-BWP means that the adjacent beam coverage area and the first beam coverage area have different frequency domain resources, and the measurement configuration includes: BWP information (BWP ID, BWP position and bandwidth, SCS, CP).

CC Information

In one example, the measurement configuration also includes intra-CC information. Intra-CC means that the frequency domain resources of the adjacent beam coverage area and the first beam coverage area are the same, then the frequency domain resource needs not to be indicated, only the PCI or satellite ID needs to be indicated. Intra-CC can also refer to the same CC, but using different BWPs under the CC. In this case, the BWP information needs to be carried, including BWP ID, BWP position and bandwidth, and SCS.

In one example, the measurement configuration also includes inter-CC information. Inter-CC means that the adjacent beam coverage area and the first beam coverage area have different frequency domain resources. If different CCs are used directly, the measurement configuration includes: CC information (CC ID, CC position and bandwidth, SCS). PCI or Satellite ID.

Inter-CC means that the adjacent beam coverage area and the first beam coverage area have different frequency domain resources. If a BWP in different CCs is used, the measurement configuration needs to carry the BWP information in addition to the CC information, PCI or satellite ID. The BWP information includes BWP ID, BWP position and bandwidth, SCS. Alternatively, the measurement configuration may directly indicate the BWP information.

Information on a Reference Signal Used for Beam Measurement

In one example, the measurement configuration further includes: a reference signal ID used for beam measurement of the first beam coverage area, and a time-frequency resource position of the reference signal, a port ID, and the like.

Measurement Gap

If the frequency domain resource of the adjacent beam coverage area is different from the frequency domain resource of the first beam coverage area, such as inter-BWP, inter-CC, inter-frequency, or the frequency domain resources are the same, but the SCSs are different, the measurement configuration also include a configuration of the measurement gap. That is, the terminal needs to perform the measurement and cannot perform a normal uplink and downlink communication with the network device in the current first beam coverage area within the measurement gap.

Optionally, the measurement configuration is carried in the second RRC information or system information. System information, also called system broadcast, includes several system information blocks (SIBs), such as SIB1 or other system information (such as SIB2, SIB3, SIB4 . . . ) Optionally, the system information is sent periodically or after a terminal request.

At block 740, the terminal receives the measurement configuration of the adjacent beam coverage area sent by the network device.

In an example, when the terminal measures that a signal quality of the reference signal of the current first beam coverage area is lower than a threshold (indicated by system information or the second RRC signaling), the terminal reports a measurement result of the current first beam coverage area to the base station, and the base station instructs the terminal to perform measurement on the adjacent beam coverage area according to the measurement configuration of the system information or the second RRC signaling.

In an example, the signal quality is represented by a reference signal received power (RSRP) of layer 1 (L1) or layer 3 (L3) or a reference signal received quality (RSRQ) of L1 or L3.

During the measurement process, the terminal can use a receiving beam scanning to receive the reference signal from the adjacent beam coverage area and find the most suitable receiving beam.

When the reference signal of the adjacent beam coverage area satisfies a trigger condition (indicated by the system information or the second RRC signaling), the terminal reports the measurement result.

To sum up, in the method provided in the embodiment, the network device can send the measurement configuration to the terminal, the terminal can measure according to the measurement configuration, and then the terminal can report the measurement result to the network device, which can realize that the terminal in the connected state performs the measurement on different beam coverage areas to provide reference information for the network equipment in the process of indicating the beam coverage area switching.

The above-mentioned embodiments can be implemented individually or in combination. The steps performed by the network device in the above embodiments may be implemented as a switching indicating method on the network device side, and the steps performed by the terminal may be implemented as a switching method on the terminal side.

It should be noted that the "second beam coverage area after the switching" herein refers to the target beam coverage area during the beam coverage area switching process, which is used to indicate the second beam coverage area to which the terminal is about to switch, but does not mean that the terminal has been switched to the second beam coverage area.

Figure 8:
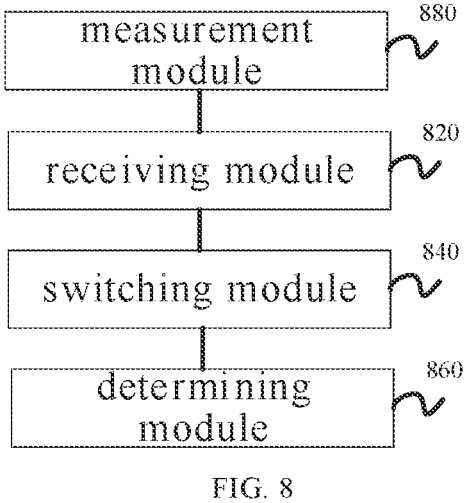
FIG. 8 is a block diagram of a switching apparatus for a terminal according to the embodiment of the disclosure.

FIG. 8 shows a switching apparatus for a terminal provided by an embodiment of the present disclosure. The apparatus can be applied to a terminal, and the apparatus includes:

a receiving module 820, configured to receive an indication signaling, in which the indication signaling is configured to indicate a target communication resource; and a switching module 840, configured to switch from a service communication resource to the target communication resource based on the indication signaling.

In an optional design of the present disclosure, the indication signaling is configured to indicate at least one of a target frequency spectrum resource and a target beam direction. The switching module 840 is configured to switch to the target frequency spectrum resource from a service frequency spectrum resource based on the indication signaling; or, the switching module 840 is configured to switch to the target beam direction from a service beam direction based on the indication signaling; or, the switching module 840 is configured to switch to the target frequency spectrum resource from a service frequency spectrum resource based on the indication signaling and switch to the target beam direction from a service beam direction based on the indication signaling.

In an optional design of the present disclosure, the indication signaling indicates a first frequency spectrum resource; the apparatus corresponds to a signaling beam and a data beam.

The switching module 840 is configured to switch to the first frequency spectrum resource from a service frequency spectrum resource corresponding to the signaling beam and/or a service frequency spectrum resource corresponding to the data beam based on the indication signaling.

In an optional design of the present application, the indication signaling indicates a first frequency spectrum resource and a second frequency spectrum resource; the terminal is configured with a signaling beam and a data beam.

The switching module 840 is configured to switch to the first frequency spectrum resource from a service frequency spectrum resource corresponding to the signaling beam and switch to the second frequency spectrum resource from a service frequency spectrum resource corresponding to the data beam based on the indication signaling.

In an optional design of the present disclosure, the target frequency spectrum resource is the same as or different from the service frequency spectrum resource.

In an optional design of the present disclosure, the indication signaling indicates a first beam direction; the terminal is configured with a signaling beam and a data beam.

The switching module 840 is configured to switch to the first beam direction from a service beam direction corresponding to the signaling beam and/or a service beam direction corresponding to the data beam based on the indication signaling.

In an optional design of the present disclosure, the indication signaling indicates a first beam direction and a second beam direction; the terminal is configured with a signaling beam and a data beam.

The switching module 840 is configured to switch to the first beam direction from a service beam direction corresponding to the signaling beam and switch to the second beam direction from a service beam direction corresponding to the data beam based on the indication signaling.

In an optional design of the present disclosure, the target beam direction is the same as or different from the service beam direction.

In an optional design of the present disclosure, the indication signaling is configured to indicate N sets of target frequency spectrum resources and/or target beam directions corresponding to N switchings, where N is an integer greater than or equal to 1.

In an optional design of the present disclosure. N is an integer greater than 1; the indication signaling further includes: a time interval between two adjacent switchings.

In an optional design of the present disclosure, the terminal stores a correspondence between frequency spectrum resources and beam directions, and the apparatus further includes a determining module 660.

The determining module 660 is configured to, in response to the indication signaling carrying a resource identity (ID) of the target frequency spectrum resource, determine a beam ID of the target beam direction based on the resource ID and the correspondence;

The determining module 660 is configured to, in response to the indication signaling carrying the beam ID of the target beam direction, determine the resource ID of the target frequency spectrum resource based on the beam ID and the correspondence.

In an optional design of the present disclosure, the target spectrum resource includes at least one of a downlink frequency spectrum resource and an uplink frequency spectrum resource; the target beam direction includes at least one of a downlink beam direction and an uplink beam direction.

In an optional design of the present disclosure, the receiving module 820 is configured to receive a first radio resource control (RRC) signaling, in which the first RRC signaling is configured to indicate at least one of the target frequency spectrum resource and the target beam direction.

In an optional design of the present disclosure, the first RRC signaling is a handover command; the handover command carries at least one of the followings:

a resource ID of the first frequency spectrum resource;

a resource ID of the second frequency spectrum resource;

a beam ID of the first beam direction:

a beam ID of the second beam direction.

In an optional design of the present disclosure, the receiving module 820 is configured to receive a second RRC signaling;

The resource ID includes a CCID, and the second RRC signaling carries CC information corresponding to the CC ID; or, the resource ID includes a BWP ID, and the second RRC signaling carries BWP information corresponding to the BWP ID; or, the resource ID includes a frequency band ID, and the second RRC signaling carries frequency band information corresponding to the frequency band ID.

In an optional design of the present disclosure, the receiving module 820 is configured to receive a third RRC signaling, in which the third RRC signaling carries reference signal information corresponding to the reference signal ID.

In an optional design of the present disclosure, the first RRC signaling does not carry a physical cell identifier (PCI) indication field; or the first RRC signaling carries a PCI indication field and the PCI indication field is NULL; or the first RRC signaling carries a PCI indication field and the PCI indication field carries a PCI the same as a PCI of a first beam coverage area; or the first RRC signaling carries a PCI indication field, the PCI indication field is not NULL, and the PCI indication field carries a PCI different from a PCI of a first beam coverage area.

In an optional design of the present disclosure, the first RRC signaling does not carry a satellite ID indication field; or the first RRC signaling carries a satellite ID indication field and the satellite ID indication field is NULL; or the first RRC signaling carries a satellite ID indication field and the satellite ID indication field carries a satellite ID the same as a satellite ID of a first beam coverage area; or the first RRC signaling carries a satellite ID indication field, the satellite ID indication field is not NULL, and the satellite ID indication field carries a satellite ID different from a satellite ID of a first beam coverage area.

In an optional design of the present disclosure, the first RRC signaling further carries TA value information.

In an optional design of the present disclosure, the first RRC signaling further carries a T duration, and the T duration is configured to instruct the terminal to complete the switching within the T duration after receiving the first RRC signaling.

In an optional design of the present disclosure, the first RRC signaling is further configured to indicate random access related information to the terminal.

In an optional design of the present disclosure, the first RRC signaling is further configured to indicate an ID of the second beam coverage area.

In an optional design of the present disclosure, target frequency spectrum resource includes a target signaling frequency spectrum resource and/or a target data frequency spectrum resource; the target beam direction comprises a target signaling beam and/or a target data beam.

Receiving the Indication Signaling Includes:

receiving at least two signalings, in which the at least two signalings are configured to indicate target information coordinately, and the target information includes at least one of the target signaling frequency spectrum resource, the target data frequency spectrum resource, the target signaling beam and the target data beam.

In an optional design of the present disclosure, the at least two signalings include a first signaling and a second signaling.

The first signaling includes a fourth RRC signaling, and the second signaling includes a MAC signaling; or, the first signaling includes a fourth RRC signaling, and the second signaling includes a DCI signaling, or, the first signaling includes a fourth RRC signaling, and the second signaling includes a MAC signaling and a DCI signaling; or, the first signaling includes a fourth RRC signaling and a MAC signaling, the second signaling includes a DCI signaling.

In an optional design of the present disclosure, first information in the target information is jointly indicated by the first signaling and the second signaling.

Remaining information other than the first information in the target information is indicated by the first signaling.

In an optional design of the present disclosure, neither the first RRC signaling nor the second signaling carries a physical cell identifier (PCI) indication field; or at least one of the first RRC signaling and the second signaling carries a PCI indication field and the PCI indication field is NULL; or at least one of the first RRC signaling and the second signaling carries a PCI indication field, the PCI indication field is not NULL.

In an optional design of the present disclosure, neither the first RRC signaling nor the second signaling carries a satellite ID indication field; or at least one of the first RRC signaling and the second signaling carries a satellite ID indication field and the satellite ID indication field is NULL; or at least one of the first signaling and the second signaling carries a satellite ID indication field, the satellite ID indication field is not NULL.

In an optional design of the present disclosure, at least one of the first signaling and the second signaling further carries a new TA.

In an optional design of the present disclosure, at least one of the first signaling and the second signaling further carries a T duration, and the T duration is configured to instruct the terminal to complete the switching within the T duration after receiving the first RRC signaling.

In an optional design of the present disclosure, at least one of the first signaling and the second signaling is further configured to indicate random access related information to the terminal.

In an optional design of the present disclosure, at least one of the first signaling and the second signaling is further configured to indicate an ID of the second beam coverage area after the switching.

In an optional design of the present disclosure, the receiving module 820 is configured to receive a measurement configuration of an adjacent beam coverage area.

A measurement module 880 is configured to perform a measurement on the adjacent beam coverage area based on the measurement configuration.

In an optional design of the present disclosure, the measurement configuration includes at least one of the following configurations:

a physical cell identifier of the adjacent beam coverage area;

a satellite ID of the adjacent beam coverage area;

frequency domain resource information of the adjacent beam coverage area;

satellite information;

BWP information;

CC information;

reference signal information used for a beam measurement;

a measurement gap.

In an optional design of the present disclosure, the measurement configuration is carried in the second RRC signaling or system information.

The apparatus in this embodiment is further configured to perform each step performed by the terminal in the foregoing method embodiment, and to send various information, both of which can be referred to each other, and will not be repeated one by one.

Figure 9:
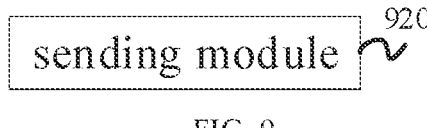
FIG. 9 is a block diagram of a switching indicating apparatus for a terminal according to the embodiment of the disclosure.

FIG. 9 shows a switching apparatus for a terminal provided by an embodiment of the present disclosure. The apparatus can be applied to a network device, and the apparatus includes:

a sending module 920 configured to send an indication signaling to the terminal, in which the indication signaling is configured to indicate a target communication resource.

In an optional design of the embodiment, the target frequency spectrum resource and/or the target beam direction. Optionally, the terminal is a terminal in a connected state.

In an optional design of the embodiment, the target frequency spectrum resource is the same as or different from a service frequency spectrum resource of the terminal; the target beam direction is the same as or different from a service beam direction of the terminal.

In an optional design of the embodiment, the indication information indicates at least one of the following information:

a first frequency spectrum resource;

a second frequency spectrum resource;

a first beam direction;

a second beam direction.

In an optional design of the embodiment, the indication signaling is configured to indicate N sets of target frequency spectrum resources and/or target beam directions corresponding to N switchings, where N is an integer greater than or equal to 1.

In an optional design of the embodiment, N is an integer greater than 1; the indication signaling further includes: a time interval between two adjacent switchings.

In an optional design of the embodiment, the sending module 920 is configured to send a first RRC signaling to the terminal, in which the first RRC signaling carries the indication signaling.

In an optional design of the embodiment, the first RRC signaling is a handover command; the handover command carries at least one of the followings:

a resource ID of the first frequency spectrum resource;

a resource ID of the second frequency spectrum resource;

a beam ID of the first beam direction;

a beam ID of the second beam direction.

In an optional design of the embodiment, the sending module 920 is configured to send a second RRC signaling to the terminal.

The resource ID includes a CCID, and the second RRC signaling carries CC information corresponding to the CC ID; or, the resource ID includes a BWP ID, and the second RRC signaling carries BWP information corresponding to the BWP ID; or, the resource ID includes a frequency band ID, and the second RRC signaling carries frequency band information corresponding to the frequency band ID.

In an optional design of the embodiment, the sending module 920 is configured to send a third RRC signaling to the terminal, in which the third RRC signaling carries reference signal information corresponding to the reference signal ID.

In an optional design of the embodiment, the target frequency spectrum resource includes: a target signaling frequency spectrum resource and/or a target data frequency spectrum resource; the target beam direction includes: a target signaling beam and/or a target data beam;

The sending module 920 is configured to send at least two signalings to the terminal, in which the at least two signalings are configured to indicate target information coordinately, and the target information includes at least one of the target signaling frequency spectrum resource, the target data frequency spectrum resource, the target signaling beam and the target data beam.

In an optional design of the embodiment, the at least two signalings include a first signaling and a second signaling.

The first signaling includes a fourth RRC signaling, and the second signaling includes a MAC signaling; or, the first signaling includes a fourth RRC signaling, and the second signaling includes a DCI signaling; or, the first signaling includes a fourth RRC signaling, and the second signaling includes a MAC signaling and a DCI signaling; or, the first signaling includes a fourth RRC signaling and a MAC signaling, the second signaling includes a DCI signaling.

In an optional design of the embodiment, first information in the target information is jointly indicated by the first signaling and the second signaling; remaining information other than the first information in the target information is indicated by the first signaling.

In an optional design of the embodiment, the sending module 920 is configured to send a measurement configuration of an adjacent beam coverage area to the terminal, in which the measurement configuration is configured to indicate performing a measurement on the adjacent beam coverage area.

In an optional design of the embodiment, the measurement configuration includes at least one of the following configurations:

a physical cell identifier of the adjacent beam coverage area;

a satellite ID of the adjacent beam coverage area;

frequency domain resource information of the adjacent beam coverage area;

satellite information;

BWP information;

CC information:

reference signal information used for a beam measurement;

a measurement gap.

In an optional design of the present disclosure, the measurement configuration is carried in the second RRC signaling or system information.

The apparatus in this embodiment is further configured to perform each step performed by the network device in the foregoing method embodiment, and to send various information, both of which can be referred to each other and will not be repeated one by one.

Figure 10:
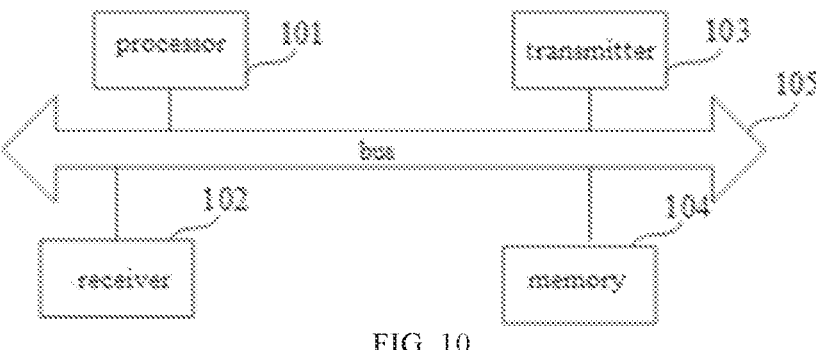
FIG. 10 is a block diagram of a communication device according to the embodiment of the disclosure.

FIG. 10 shows a schematic structural diagram of a communication device (network device or terminal) provided by an embodiment of the present disclosure. The communication device includes: a processor 101, a receiver 102, a transmitter 103, a memory 104 and a bus 105.

The processor 101 includes one or more processing cores, and the processor 101 executes various functional applications and information processing by running software programs and modules.

The receiver 102 and the transmitter 103 may be implemented as a communication component, which may be a communication chip.

The memory 104 is connected to the processor 101 through the bus 105.

The memory 104 may be configured to store at least one instruction, and the processor 101 may be configured to execute the at least one instruction, so as to implement various steps in the foregoing method embodiments.

Additionally, the memory 104 may be implemented by any type or combination of volatile or non-volatile storage devices including, but not limited to, magnetic or optical disks, electrically erasable programmable Read-Only Memory (Erasable Programmable Read Only Memory, EEPROM), Erasable Programmable Read Only Memory (EPROM), Static Random Access Memory (SRAM), Read-Only Memory (Read-Only Memory, ROM), magnetic memory, flash memory, programmable read-only memory (Programmable Read-Only Memory, PROM).

In an embodiment, a computer-readable storage medium is also provided. The computer-readable storage medium stores at least one instruction, at least one piece of program, code set or instruction set, the at least one instruction, the at least one piece of program, the code set or the instruction set is loaded and executed by the processor to implement the switching method for a terminal executed by the terminal or the switching indicating method for a terminal executed by the network device provided by the above method embodiments.

Those of ordinary skill in the art can understand that all or part of the steps of implementing the above embodiments can be completed by hardware, or can be completed by instructing relevant hardware through a program, and the program can be stored in a computer-readable storage medium. The storage medium mentioned may be a read-only memory, a magnetic disk or an optical disk, etc.

The above are only optional embodiments of the present application, and are not intended to limit the present application. Any modifications, equivalent replacements, improvements, etc. made within the spirit and principles of the present application shall be included in the protection of the present application, within the range.

What is claimed is:

1. A switching method performed by a terminal, the method comprising:

receiving an indication signaling, wherein the indication signaling is configured to indicate a target communication resource; and switching to the target communication resource from a service communication resource based on the indication signaling;

wherein the indication signaling is carried in a first radio resource control (RRC) signaling, and the first RRC signaling further carries timing advance (TA) value information;

wherein the target communication resource comprises at least one of a target frequency spectrum resource and a target beam direction, the service communication resource comprises at least one of a service frequency spectrum resource and a service beam direction; and switching to the target communication resource from the service communication resource based on the indication signaling comprises one of:

switching to the target frequency spectrum resource from the service frequency spectrum resource based on the indication signaling;

switching to the target beam direction from the service beam direction based on the indication signaling; or switching to the target frequency spectrum resource from the service frequency spectrum resource based on the indication signaling and switching to the target beam direction from the service beam direction based on the indication signaling;

wherein the target communication resource comprises a first frequency spectrum resource, and the terminal is configured with a signaling beam and a data beam, the service frequency spectrum resource comprises a service frequency spectrum resource corresponding to the signaling beam and a service frequency spectrum resource corresponding to the data beam; and switching to the target frequency spectrum resource from the service frequency spectrum resource based on the indication signaling comprises:

switching to the first frequency spectrum resource from at least one of the service frequency spectrum resource corresponding to the signaling beam and the service frequency spectrum resource corresponding to the data beam based on the indication signaling.

2. The method of claim 1, wherein the target communication resource comprises a first frequency spectrum resource and a second frequency spectrum resource, the terminal is configured with a signaling beam and a data beam, and the service frequency spectrum resource comprises a service frequency spectrum resource corresponding to the signaling beam and a service frequency spectrum resource corresponding to the data beam;

switching to the target frequency spectrum resource from the service frequency spectrum resource based on the indication signaling comprises:

switching to the first frequency spectrum resource from the service frequency spectrum resource corresponding to the signaling beam based on the indication signaling and switching to the second frequency spectrum resource from the service frequency spectrum resource corresponding to the data beam based on the indication signaling.

3. The method of claim 1, wherein the target communication resource comprises a first beam direction, the terminal is configured with a signaling beam and a data beam, and the service beam direction comprises a service beam direction corresponding to the signaling beam and a service beam direction corresponding to the data beam;

switching to the target beam direction from the service beam direction based on the indication signaling comprises:

switching to the first beam direction from at least one of the service beam direction corresponding to the signaling beam and the service beam direction corresponding to the data beam based on the indication signaling.

4. The method of claim 1, wherein the target communication resource comprises a first beam direction and a second beam direction, the terminal is configured with a signaling beam and a data beam, and the service beam direction comprises a service beam direction corresponding to the signaling beam and a service beam direction corresponding to the data beam;

switching to the target beam direction from the service beam direction based on the indication signaling comprises:

switching to the first beam direction from the service beam direction corresponding to the signaling beam based on the indication signaling and switching to the second beam direction from the service beam direction corresponding to the data beam based on the indication signaling.

5. The method of claim 1, wherein the target beam direction is the same as or different from the service beam direction; or the target frequency spectrum resource is the same as or different from the service frequency spectrum resource.

6. The method of claim 1, wherein the target communication resource comprises N sets of target frequency spectrum resources and/or target beam directions corresponding to N switchings, where N is an integer greater than or equal to 1.

7. The method of claim 6, wherein N is an integer greater than 1; and the indication signaling further comprises a time interval between two adjacent switchings.

8. The method of claim 1, wherein the terminal is stored with a correspondence between frequency spectrum resources and beam directions, and the method further comprises:

in response to the indication signaling carrying a resource identity (ID) of the target frequency spectrum resource, determining a beam ID of the target beam direction based on the resource ID of the target frequency spectrum resource and the correspondence; or in response to the indication signaling carrying the beam ID of the target beam direction, determining the resource ID of the target frequency spectrum resource based on the beam ID of the target beam direction and the correspondence.

9. The method of claim 1, wherein, the target frequency spectrum resource comprises at least one of a downlink frequency spectrum resource and an uplink frequency spectrum resource; and the target beam direction comprises at least one of a downlink beam direction and an uplink beam direction.

10. The method of claim 1, wherein receiving the indication signaling comprises:

receiving the first radio resource control (RRC) signaling, wherein the first RRC signaling is configured to indicate at least one of the target frequency spectrum resource and the target beam direction.

11. The method of claim 10, wherein the first RRC signaling is a handover command, wherein the handover command carries at least one of:

a resource ID of a first frequency spectrum resource;

a resource ID of a second frequency spectrum resource;

a beam ID of a first beam direction; and a beam ID of a second beam direction.

12. The method of claim 11, before receiving the first RRC signaling, further comprising:

receiving a second RRC signaling;

wherein the resource ID of the target frequency spectrum resource comprises a component carrier identity (CCID), the second RRC signaling carries component carrier (CC) information corresponding to the CCID; or the resource ID of the target frequency spectrum resource comprises a bandwidth part identity (BWP ID), the second RRC signaling carries bandwidth part (BWP) information corresponding to the BWP ID; or the resource ID of the target frequency spectrum resource comprises a frequency band ID, the second RRC signaling carries frequency band information corresponding to the frequency band ID.

13. The method of claim 11, wherein each of the beam ID of the first beam direction and the beam ID of the second beam direction comprises a reference signal ID, before receiving the first RRC signaling, the method further comprises:

receiving a third RRC signaling, wherein the third RRC signaling carries reference signal information corresponding to the reference signal ID.

14. The method of claim 10, wherein, the first RRC signaling does not carry a physical cell identifier (PCI) indication field; or the first RRC signaling carries a PCI indication field and the PCI indication field is NULL; or the first RRC signaling carries a PCI indication field and the PCI indication field carries a PCI the same as a PCI of a first beam coverage area;

or the first RRC signaling carries a PCI indication field, the PCI indication field is not NULL, and the PCI indication field carries a PCI different from a PCI of a first beam coverage area.

15. The method of claim 10, wherein, the first RRC signaling does not carry a satellite ID indication field; or the first RRC signaling carries a satellite ID indication field and the satellite ID indication field is NULL; or the first RRC signaling carries a satellite ID indication field and the satellite ID indication field carries a satellite ID the same as a satellite ID of a first beam coverage area;

or the first RRC signaling carries a satellite ID indication field, the satellite ID indication field is not NULL, and the satellite ID indication field carries a satellite ID different from a satellite ID of a first beam coverage area.

16. The method of claim 10, wherein the first RRC signaling further carries one of:

a T duration, wherein the T duration is configured to instruct the terminal to complete the switching within the T duration after receiving the first RRC signaling;

random access related information; and an ID of a second beam coverage area after the switching.

17. The method of claim 1, wherein the target frequency spectrum resource comprises a target signaling frequency spectrum resource and/or a target data frequency spectrum resource; the target beam direction comprises a target signaling beam and/or a target data beam;

wherein receiving the indication signaling comprises:

receiving at least two signalings, wherein the at least two signalings are configured to indicate target information coordinately, and the target information comprises at least one of the target signaling frequency spectrum resource, the target data frequency spectrum resource, the target signaling beam and the target data beam.

18. The method of claim 17, wherein the at least two signalings comprise a first signaling and a second signaling;

the first signaling comprises a fourth RRC signaling, the second signaling comprises a media access control (MAC) signaling;

or the first signaling comprises a fourth RRC signaling, the second signaling comprises a downlink control information (DCI) signaling;

or the first signaling comprises a fourth RRC signaling, the second signaling comprises a MAC signaling and a DCI signaling;

or the first signaling comprises a fourth RRC signaling and a MAC signaling, the second signaling comprises a DCI signaling.

19. The method of claim 18, wherein, neither the first signaling nor the second signaling carries a physical cell identifier (PCI) indication field; or at least one of the first signaling and the second signaling carries a PCI indication field and the PCI indication field is NULL; or the first signaling carries a PCI indication field and the PCI indication field carries a PCI the same as a PCI of a first beam coverage area;

or the first signaling carries a PCI indication field, the PCI indication field is not NULL, and the PCI indication field carries a PCI different from a PCI of a first beam coverage area.

20. The method of claim 18, wherein, neither the first signaling nor the second signaling carries a satellite ID indication field; or at least one of the first signaling and the second signaling carries a satellite ID indication field and the satellite ID indication field is NULL; or the first signaling carries a satellite ID indication field and the satellite ID indication field carries a satellite ID the same as a satellite ID of a first beam coverage area;

or the first signaling carries a satellite ID indication field, the satellite ID indication field is not NULL, and the satellite ID indication field carries a satellite ID different from a satellite ID of a first beam coverage area.

21. The method of claim 18, wherein at least one of the first signaling and the second signaling further carries one of:

timing advance (TA) value information;

a T duration, wherein the T duration is configured to instruct the terminal to complete the switching within the T duration after receiving the first signaling;

random access related information; and an ID of a second beam coverage area after the switching.

22. The method of claim 1, further comprising:

receiving a measurement configuration of an adjacent beam coverage area; and perform a measurement on the adjacent beam coverage area based on the measurement configuration.

23. The method of claim 22, wherein the measurement configuration comprises at least one of:

a PCI of the adjacent beam coverage area;

a satellite ID of the adjacent beam coverage area;

frequency domain resource information of the adjacent beam coverage area;

satellite information;

BWP information;

CC information;

reference signal information for a beam measurement; and a measurement gap.

24. The method of claim 22, wherein the measurement configuration is carried in a second RRC signaling or system information.

25. A switching indicating method performed by a network device, the method comprising:

sending an indication signaling to a terminal, wherein the indication signaling is configured to indicate a target communication resource, wherein the target communication resource comprises at least one of a target frequency spectrum resource and a target beam direction, the target communication resource comprises a first frequency spectrum resource;

wherein the terminal's service communication resource comprises at least one of a service frequency spectrum resource and a service beam direction, and the terminal is configured with a signaling beam and a data beam, the service frequency spectrum resource comprises a service frequency spectrum resource corresponding to the signaling beam and a service frequency spectrum resource corresponding to the data beam, and the indication signaling enabling enables the terminal to switch to the first frequency spectrum resource from at least one of the service frequency spectrum resource corresponding to the signaling beam and the service frequency spectrum resource corresponding to the data beam;

wherein the indication signaling is carried in a first radio resource control (RRC) signaling, and the first RRC signaling further carries timing advance (TA) value information.

26. The method of claim 25, wherein
the target frequency spectrum resource is the same as or different from the service frequency spectrum resource currently being used by the terminal; and
the target beam direction is the same as or different from the service beam direction currently being used by the terminal.

27. The method of claim 25, wherein the target communication resource further comprises at least one of:
a second frequency spectrum resource;
a first beam direction; and
a second beam direction.

28. The method of claim 25, wherein the target communication resource comprises N sets of target frequency spectrum resources and/or target beam directions corresponding to N switchings, where N is an integer greater than or equal to 1.

29. The method of claim 28, wherein N is an integer greater than 1; and
the indication signaling further comprises a time interval between two adjacent switchings.

30. The method of claim 25, wherein the first RRC signaling is a handover command, wherein the handover command carries at least one of:
a resource ID of a first frequency spectrum resource;
a resource ID of a second frequency spectrum resource;
a beam ID of a first beam direction; and
a beam ID of a second beam direction.

31. The method of claim 30, before sending the first RRC signaling to the terminal, further comprising:
sending a second RRC signaling to the terminal;
wherein the resource ID of the first or second frequency spectrum resource comprises a component carrier identity (CCID), the second RRC signaling carries component carrier (CC) information corresponding to the CCID; or the resource ID of the first or second frequency spectrum resource comprises a bandwidth part identity (BWP ID), the second RRC signaling carries bandwidth part (BWP) information corresponding to the BWP ID; or the resource ID of the first or second frequency spectrum resource comprises a frequency band ID, the second RRC signaling carries frequency band information corresponding to the frequency band ID.

32. The method of claim 30, wherein the beam ID of the first or second beam direction comprises a reference signal ID, before sending the first RRC signaling to the terminal, the method further comprises:
sending a third RRC signaling to the terminal, wherein the third RRC signaling carries reference signal information corresponding to the reference signal ID.

33. The method of claim 25, wherein the target frequency spectrum resource comprises a target signaling frequency spectrum resource and/or a target data frequency spectrum resource; the target beam direction comprises a target signaling beam and/or a target data beam;
wherein sending the indication signaling to the terminal comprises:
sending at least two signalings to the terminal, wherein the at least two signalings are configured to indicate target information coordinately, and the target information comprises at least one of the target signaling frequency spectrum resource, the target data frequency spectrum resource, the target signaling beam and the target data beam.

34. The method of claim 33, wherein the at least two signalings comprise a first signaling and a second signaling;
the first signaling comprises a fourth RRC signaling, the second signaling comprises a media access control (MAC) signaling;
or
the first signaling comprises a fourth RRC signaling, the second signaling comprises a downlink control information (DCI) signaling;
or
the first signaling comprises a fourth RRC signaling, the second signaling comprises a MAC signaling and a DCI signaling;
or
the first signaling comprises a fourth RRC signaling and a MAC signaling, the second signaling comprises a DCI signaling.

35. The method of claim 25, further comprising:
sending a measurement configuration of an adjacent beam coverage area to the terminal, wherein the measurement configuration is configured to indicate performing a measurement on the adjacent beam coverage area.

36. The method of claim 35, wherein the measurement configuration comprises at least one of:
a PCI of the adjacent beam coverage area;
a satellite ID of the adjacent beam coverage area;
frequency domain resource information of the adjacent beam coverage area;
satellite information;
BWP information;
CC information;
reference signal information for a beam measurement; and
a measurement gap.

37. A terminal, comprising:
a processor;
a transceiver connected to the processor; and
a memory for storing instructions executable by the processor;
wherein the processor is configured to:
receive an indication signaling, wherein the indication signaling is configured to indicate a target communication resource; and switch to the target communication resource from a service communication resource based on the indication signaling;

wherein the indication signaling is carried in a first radio resource control (RRC) signaling, and the first RRC signaling further carries timing advance (TA) value information;

wherein the target communication resource comprises at least one of a target frequency spectrum resource and a target beam direction, the service communication resource comprises at least one of a service frequency spectrum resource and a service beam direction; and the processor is further configured to:

switch to the target frequency spectrum resource from the service frequency spectrum resource based on the indication signaling;

switch to the target beam direction from the service beam direction based on the indication signaling; or switch to the target frequency spectrum resource from the service frequency spectrum resource based on the indication signaling and switching to the target beam direction from the service beam direction based on the indication signaling;

wherein the target communication resource comprises a first frequency spectrum resource, and the terminal is configured with a signaling beam and a data beam, the service frequency spectrum resource comprises a service frequency spectrum resource corresponding to the signaling beam and a service frequency spectrum resource corresponding to the data beam; and the processor is further configured to:

switch to the first frequency spectrum resource from at least one of the service frequency spectrum resource corresponding to the signaling beam and the service frequency spectrum resource corresponding to the data beam based on the indication signaling.

* * * * *